United States Patent
Gerlach

(10) Patent No.: US 11,426,695 B2
(45) Date of Patent: Aug. 30, 2022

(54) MEDIA AND AIR FILTERS FOR CARBON DIOXIDE SEQUESTRATION

(71) Applicant: Richard Gerlach, Sudbury (CA)

(72) Inventor: Richard Gerlach, Sudbury (CA)

(73) Assignee: Richard Gerlach, Sudbury (CA)

( * ) Notice: Subject to any disclaimer, the term of this patent is extended or adjusted under 35 U.S.C. 154(b) by 0 days.

(21) Appl. No.: 16/704,880

(22) Filed: Dec. 5, 2019

(65) Prior Publication Data

US 2020/0114310 A1    Apr. 16, 2020

Related U.S. Application Data

(63) Continuation-in-part of application No. 15/932,758, filed on Apr. 23, 2018, now abandoned.

(51) Int. Cl.
| | |
|---|---|
| *B01J 20/10* | (2006.01) |
| *B01D 53/62* | (2006.01) |
| *B01D 53/82* | (2006.01) |
| *B01D 53/04* | (2006.01) |

(52) U.S. Cl.
CPC ......... *B01D 53/62* (2013.01); *B01D 53/0407* (2013.01); *B01D 53/82* (2013.01); *B01J 20/10* (2013.01); *B01D 2253/106* (2013.01); *B01D 2253/25* (2013.01); *B01D 2253/304* (2013.01); *B01D 2253/34* (2013.01); *B01D 2257/504* (2013.01); *B01D 2258/06* (2013.01); *B01D 2259/4508* (2013.01); *Y02C 20/40* (2020.08)

(58) Field of Classification Search
None
See application file for complete search history.

(56) References Cited

U.S. PATENT DOCUMENTS

| | | | |
|---|---|---|---|
| 3,861,963 A | 1/1975 | Afrance et al. | |
| 2011/0006263 A1* | 1/2011 | Caplain | C04B 20/06 252/378 R |
| 2017/0007991 A1* | 1/2017 | Bauer | C04B 35/18 |

FOREIGN PATENT DOCUMENTS

| | | | | |
|---|---|---|---|---|
| GB | 2081247 A | * | 2/1982 | C03C 13/06 |

OTHER PUBLICATIONS

Schuiling, et al., "Enhanced Weathering: An Effective and Cheap Tool To Sequester CO2", Climatic Change, 74: 349, pp. 349-354. (2006) (https://doi.org/10.1007/s10584-005-3485-y).

* cited by examiner

*Primary Examiner* — Daniel Berns
(74) *Attorney, Agent, or Firm* — Kramer & Amado, P.C.

(57) ABSTRACT

Filter media and filters for the sequestration of carbon dioxide are disclosed. The carbon dioxide sequestering filter media incorporate silicate minerals, and the carbon dioxide sequestering filters incorporate carbon dioxide sequestering filter media. Filters using only carbon dioxide sequestering media and filters combining carbon dioxide sequestering media with traditional air filter media are disclosed. The carbon dioxide sequestering filters may be used instead of traditional air filters in residential, commercial and industrial applications.

11 Claims, 2 Drawing Sheets

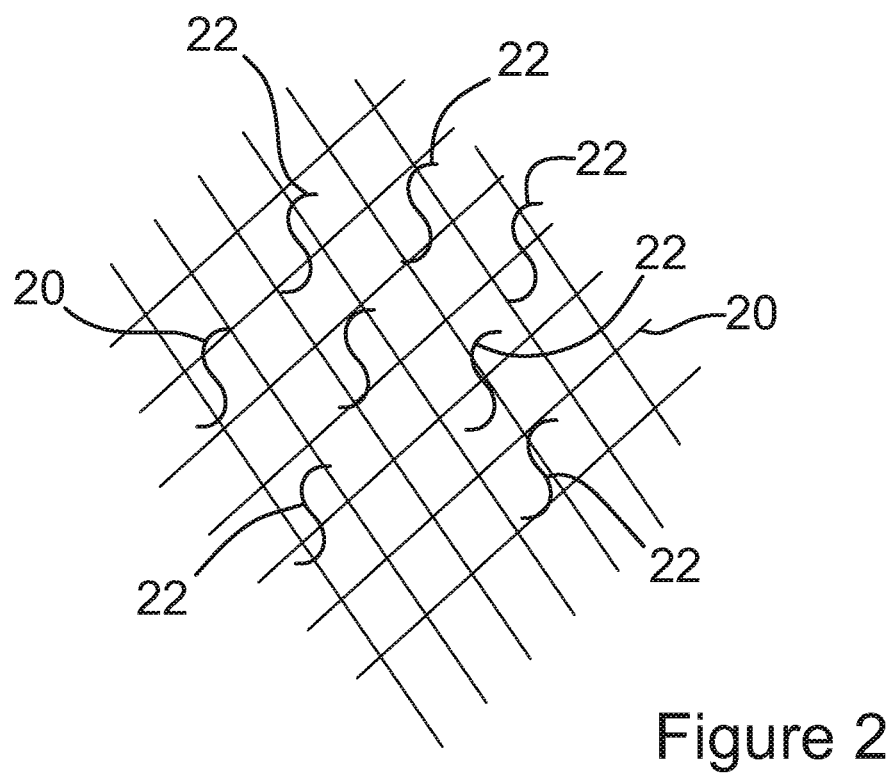
Figure 2
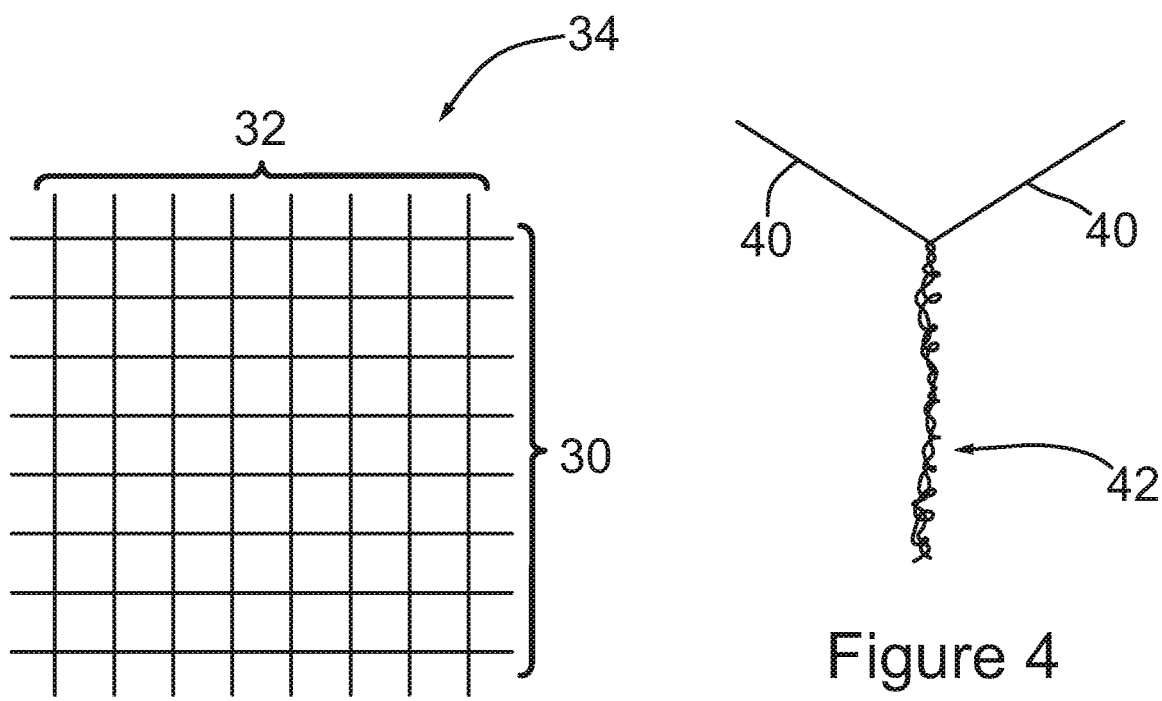
Figure 3
Figure 4

MEDIA AND AIR FILTERS FOR CARBON DIOXIDE SEQUESTRATION

BACKGROUND OF THE INVENTION

Carbon dioxide, along with other greenhouse gases, are responsible for the greenhouse effect, which is causing the Earth's temperature to rise. Reducing greenhouse gases would, in theory, reduce the greenhouse effect and stop the rise in the Earth's temperature. Carbon dioxide is the second most important greenhouse gas and it is controllable. Current efforts to control the amount of carbon dioxide in the atmosphere include the reduction in the use of fossil fuels, sequestering carbon dioxide at the site where large amounts of fossil fuels are consumed in industrial processes, and sequestering some of the carbon dioxide already in the atmosphere.

Current carbon sequestering involves expensive, energy consuming large scale systems that process flue gases and must be installed at the site of the carbon dioxide emission. The carbon dioxide emissions at the site of the large scale sequestering is generally 10% or more of the flue gases. The high amount of carbon dioxide in industrial emissions justifies the money spent to sequester the carbon dioxide because there is lots of it (carbon dioxide) to sequester at one location. See Bill Freedman and Todd Keith, "Planting trees for carbon credits: a discussion of context, issues, feasibility, and environmental benefits", 4(2) Environmental Review (1996) pp 100-110.

Sequestering carbon dioxide from the atmosphere, for widespread consumer use, needs a different approach. The concentration of carbon dioxide in the atmosphere is about 0.04%. Large scale sequestering of carbon dioxide from the Earth's atmosphere is not practical due to the low concentrations. A proposal is to crush and spread the mineral olivine over the surface of the Earth and in the oceans. The mineral olivine and other silicate minerals sequester carbon dioxide through natural weathering when exposed to the atmosphere. See R. D. Schuiling and P. Krijgsman, "Enhanced Weathering: An Effective and Cheap Tool ro Sequester CO2", 74 *Climatic Change* pp 349-354 (2006). The proposal to spread olivine or other silicate minerals on the earth would be energy intensive expensive, and time consuming. The natural weathering process is slow in sequestering carbon dioxide because the air movement over the silicate mineral is provided by nature and is variable or non-existence at times. It is known to create an olivine coated substrate in the context of separators for batteries (not the sequestering of carbon dioxide): see U.S. Pat. No. 3,861,963A of Afrance.

BRIEF SUMMARY OF THE INVENTION

This approach sequesters small amounts of carbon dioxide at a large number of locations. This invention is focused on the use of silicate minerals as a sequestering material, in that the path of artificial moving air to sequester the low concentration of carbon dioxide from the Earth's atmosphere. All silicate minerals that sequester carbon dioxide can be considered useable by this process where practical. A preferred mineral for use with this invention is olivine as this silicate mineral is abundant in the Earth's crust. This invention will enhance the natural weathering of the silicate mineral to speed up the sequestering of carbon dioxide by using the silicate material as a filter, in the path of artificial moving air. This invention is low cost, small scale (although it can be scaled up), so that even homeowners can participate in the sequestering of carbon dioxide. Use of this invention will result in small amounts of carbon sequestering at large numbers of locations.

Carbon dioxide sequestering media can be created by bonding a silicate mineral onto a substrate such as a thread. The substrate can then be cut as desired to create small pieces of carbon dioxide sequestering media. In a second embodiment, carbon dioxide sequestering media can also be created by spinning silicate mineral into rock wool fibers. This media can be used Carbon dioxide sequestering air filter media can be created using the carbon dioxide sequestering media, which can then be used instead of traditional air filtering media in home and commercial applications. Carbon dioxide sequestering air filter media can be created, in a first embodiment, by mixing short pieces of a silicate mineral bonded to a substrate such as a thread with regular air filter media fibers. In a second embodiment, the silicate minerals spun into fibers are used on their own to form a Carbon dioxide sequestering air filter media, optionally mixed with silicate minerals bonded to a substrate such as a thread. In a third embodiment, the silicate minerals spun into fibers are mixed with air filter media fibers to form a carbon dioxide sequestering air filter media.

In accordance with the invention, there is provided a carbon dioxide sequestering air filter media comprising air filter media containing carbon dioxide sequestering media, wherein the carbon dioxide sequestering media incorporates silicate minerals. In an aspect of this invention, the carbon dioxide sequestering media comprises silicate minerals bonded to a substrate. In another aspect of this invention, the substrate is a thread. In a further aspect of this invention, the carbon dioxide sequestering media comprises silicate mineral fibers. In a further aspect of this invention, the carbon dioxide sequestering media comprises silicate minerals bonded to a substrate and silicate mineral fibers. In another aspect of this invention, the particle size of the silicate minerals is between 1.0 mm and 0.01 mm. In a further aspect of this invention, the silicate mineral is olivine.

In accordance with this invention, there is provided a carbon dioxide sequestering air filter media comprising a cloth made out of carbon dioxide sequestering media, wherein the carbon dioxide sequestering media incorporates silicate minerals. In an aspect of this invention, the carbon dioxide sequestering media comprises silicate minerals bonded to a substrate. In another aspect of this invention, the substrate is a thread. In another aspect of this invention, the carbon dioxide sequestering media comprises silicate mineral fibers. In yet another aspect of this invention, the carbon dioxide sequestering media comprises silicate minerals bonded to a substrate and silicate mineral fibers. In a further aspect of this invention, the particle size of the silicate minerals is between 1.0 mm and 0.01 mm. In another aspect of this invention, the air filter media retains almost all particles of greater than 5μ size.

In accordance with this invention, there is provided a carbon dioxide sequestering air filter, arranged so that air flowing through the filter passes through a layer of carbon dioxide sequestering media and a layer of air filter media.

In accordance with this invention, there is provided a method of sequestering carbon dioxide, comprising: inserting an air filter comprising air filter media containing carbon dioxide sequestering media, wherein the carbon dioxide sequestering media incorporates silicate minerals, into an air duct; and forcing air through the air filter. In an aspect of this invention, the carbon dioxide sequestering media comprises silicate minerals bonded to a substrate. In another aspect of this invention, the substrate is a thread. In another aspect of this invention, the carbon dioxide sequestering media comprises silicate mineral fibers.

DESCRIPTION OF THE FIGURES

In order to better understand various exemplary embodiments, reference is made to the accompanying drawings, wherein:

FIG. 2 is an illustration of carbon dioxide sequestering media mixed into traditional air filter media;

FIG. 3 is an illustration of carbon dioxide sequestering media woven to form a cloth that is a carbon dioxide sequestering air filter media; and FIG. 4 shows threads or fibers of carbon dioxide sequestering media spun or twisted to form a yarn.

DETAILED DESCRIPTION OF THE INVENTION

This invention is media for sequestering carbon dioxide from the Earth's atmosphere using enhanced weathering of silicate mineral particles, or the chemical absorption of carbon dioxide by silicate mineral particles. Such media can also include air filtering media that also sequesters carbon dioxide. These media are particularly useful for deployment in ductworks in residential, commercial and industrial buildings.

Examples of silicate minerals include basalt, wollastonite, fayalite, forsterite, olivine, and serpentine. Olivine is one of the most common minerals on earth by volume, and is widely available. Olivine is a preferred silicate mineral as it reacts easily with carbon dioxide from the atmosphere.

In this application, the term "air filter" means the air filter that cleans the air of dirt.

Carbon dioxide sequestering media can be created, in a first embodiment, by bonding a silicate material to a substrate. The substrate can have a round, square, or rectangular cross section or any other practical cross-section that is useable as described here. The silicate material is crushed to a particle size of of 0.01 to 1.0 mm, and preferably 0.010 mm. The bonding is done in such a way that when the silicate mineral particles are bonded to the substrate, the silicate mineral particles stand proud of the surface of the substrate. The substrate with the bonding agent and the silicate mineral particles can be rigid or flexible.

Figure 1A:
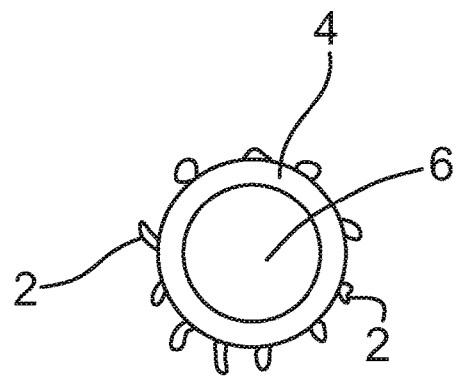
FIG. 1A a cross section of a round substrate with silicate minerals bonded to a thread.
Figure 1B:
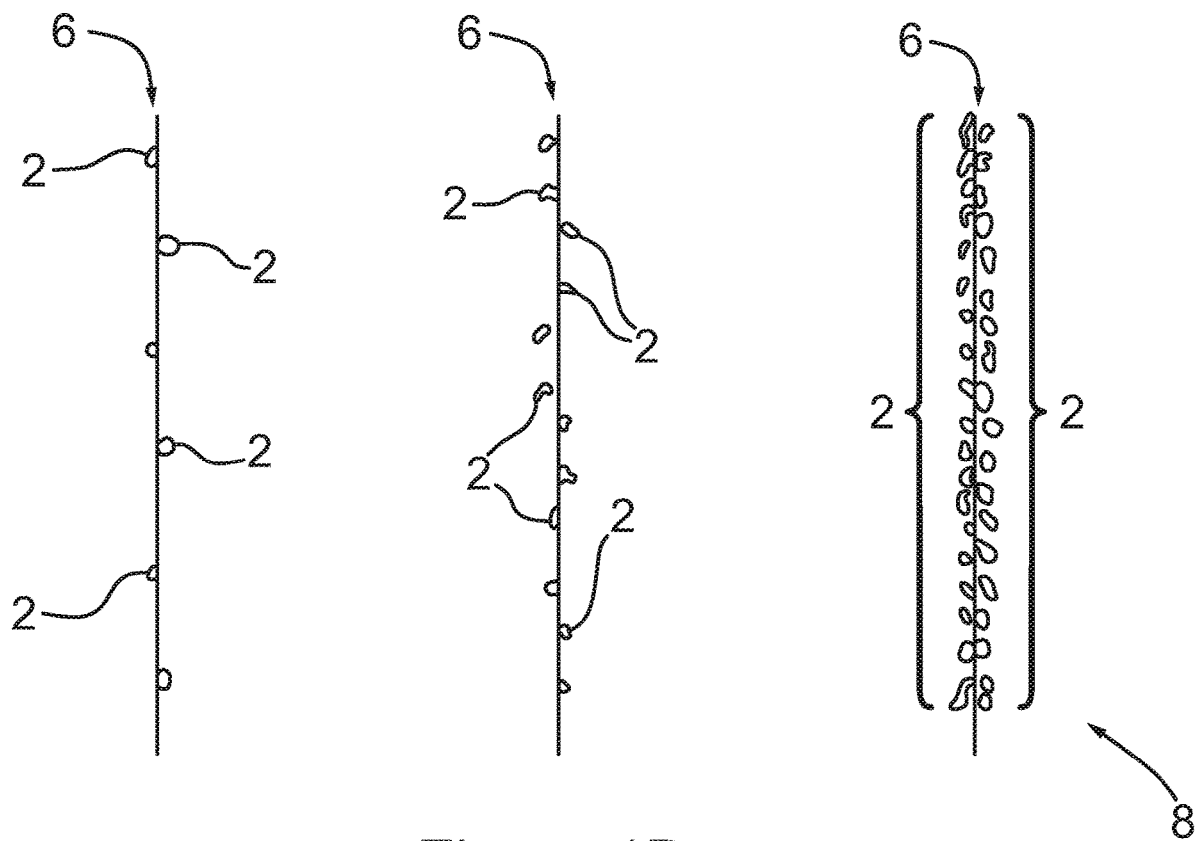
FIG. 1B is an illustration of a side view of silicate minerals bonded to threads substrate to form a first embodiment of carbon dioxide sequestering media.

FIGS. 1A and 1B illustrate silicate minerals bonded to a string or thread substrate to form an embodiment of carbon dioxide sequestering media. Turning to FIG. 1A, there are silicate mineral particles 2 bonded with bonding agent 4 to strings or threads 6, which together form an embodiment of a carbon dioxide sequestering media. Turning to FIG. 1B, it may be seen that the spacing of the silicate mineral particles 2 may vary. In a preferred embodiment, the silicate mineral particles 2 cover most of the length of thread 6, forming a covered thread 8 as seen in FIG. 1B The method of bonding may make the covered strings or threads 8 rigid, or may leave the strings or threads 8 flexible. The threads 6 may be long or short; longer threads may be woven to form a substrate or may be woven with other materials, such as air filter materials. Shorter threads may be intermingled within other media.

The silicate mineral particles are sized to a diameter between 0.01 mm to 1 mm. The silicate mineral particles may be a mixture of silicate minerals, or may be just one silicate mineral. In a preferred embodiment, the silicate mineral includes, or is entirely comprised of, olivine.

Carbon dioxide sequestering filter media can also be made without a substrate by spinning molten silicate minerals into fibers, similar to the processes used when mineral wool is manufactured. Such fibers typically have a diameter of 2-6 micrometers. The fibers created in this manner may be long or short; longer threads may be woven to form a substrate or may be woven with other materials, such as air filter materials. Shorter threads may be intermingled within other media.

The carbon dioxide filtering media may be placed in the path of artificial moving air, ideally at the position where the air temperature is the highest. The artificial moving air is at the pressure and temperature provided by the ventilation system (at ambient pressure and ambient temperature).

The artificial moving air is provided by many sources such as central heating/cooling systems and ventilation systems that are present in residential, commercial and industrial buildings. Other minor sources of artificial moving air are vacuum cleaners, automobile cabin ventilation, and kitchen exhaust fans. There are many variables in artificial moving air systems including the speed of the air flow, the volume of the air flow, and the size of the ductwork. These variables will determine the size of the crushed olivine, the substrate size, and the construction of the substrate.

Threads or fibers of carbon dioxide sequestering media may be spun to form a yarn. FIG. 4 shows spinning at least two carbon dioxide sequestering fibers or threads to form a yarn. Turning to FIG. 4, two carbon dioxide sequestering fibers or threads 40 are shown being twisted or spun to form a yarn 42. A person skilled in the art would appreciate that such yarn could be made from more than two fibers, could be made entirely from silicate mineral fibers, or entirely from threads with silicate minerals bonded to the threads or from any combination of silicate mineral fibers and threads bonded to silicate minerals.

The carbon dioxide sequestering media, whether silicate mineral bonded to a substrate or spun silicate mineral fibers, or a combination of these, or a yarn, may be suspended within a frame and inserted into ductwork such that the silicate minerals are exposed to, and absorb carbon dioxide from, the passing air. The frame and carbon dioxide sequestering media may be replaced periodically. This approach will, however, require ductwork to be either built or re-built to accommodate the frame and silicate minerals.

This can be avoided by using the carbon dioxide sequestering media to create carbon dioxide sequestering air filter media. Carbon dioxide sequestering air filter media can be used instead of traditional air filter media to create a carbon dioxide sequestering air filter, which can be used like a traditional air filter in residential, commercial and industrial settings without requiring expensive re-building of ductwork.

Carbon dioxide sequestering air filter media can be created, in a first embodiment, by mixing pieces of carbon dioxide sequestering media with regular air filters. Turning to FIG. 2, there is provided regular air filter media 20. Interspersed or mixed into the regular air filter media 20 are carbon dioxide sequestering media 22. The carbon dioxide sequestering media 22 may be silicate minerals bonded to a substrate, or may be silicate mineral fibers, or a yarn as described above. In a preferred embodiment, the carbon dioxide sequestering media 22 is silicate minerals bonded to a thread. In another preferred embodiment, the carbon dioxide sequestering media 22 is silicate minerals bonded to a thread, and the media is cut into short pieces and is then mixed with the air filter media. In another preferred embodiment, the carbon dioxide sequestering media 22 is silicate minerals bonded to a thread, and the thread is woven through the air filter media. In another preferred embodiment, the carbon dioxide sequestering media 22 is a yarn, and the yarn is woven through the air filter media. The carbon dioxide sequestering air filter media may then be used to create a carbon dioxide sequestering air filter by using the dioxide sequestering air filter media in place of traditional air filter media in nan air filter. The resulting carbon dioxide sequestering air filter may then be used in the same manner as a traditional air filter.

In a second embodiment, the carbon dioxide sequestering media is used on its own to form a carbon dioxide sequestering air filter media. Turning to FIG. 3, carbon dioxide sequestering media 30 is interwoven with carbon dioxide sequestering media 32 to create a carbon dioxide sequestering air filter media 34. Carbon dioxide sequestering air filter media 34 may be described as a cloth. Carbon dioxide sequestering media 30 and 32 may be created from either silicate minerals bonded to a substrate or silicate minerals spun into fibers, or yarns as described above. Carbon dioxide sequestering air filter media 34 may be described as a cloth. Combinations and mixtures of either silicate minerals bonded to a substrate or silicate minerals spun into fibers may be used. In a preferred embodiment, by intermixing threads or strong substrates bonded with silicate mineral fibers, greater strength and rip-resistance may be imparted to yarns or cloths as described above when compared to yarns or cloths composed entirely of silicate mineral fibers. Carbon dioxide sequestering air filter media 34 may be placed in a frame to create a carbon dioxide sequestering air filter, which may be used in place of traditional air filters.

Similar to traditional air filter media, carbon dioxide sequestering air filter media 34 must be air-porous and allow air to flow through without creating significant back-pressure problems, while the pores are sized to allow the carbon dioxide sequestering air filter media 34 to filter dirt from the air. Generally, the pores in the carbon dioxide sequestering air filter media can have ranges in performance: under the European standard EN779, these can range from Class G1: 65% performance with approaching 100% retention of particulate size greater than 5µ (coarse filters) to Class U17 with 99.999995% performance with approaching 100% retention of particulate size greater than 0.3µ (ULPA).

In another embodiment, a carbon dioxide sequestering air filter is constructed such that air flowing through the air filter passes through a layer of traditional air filter media and through a layer of carbon dioxide sequestering media. The air flowing through the air filter may pass first through a layer of traditional air filter media and then through a layer of carbon dioxide sequestering media, or air flowing through the air filter passes through a layer of carbon dioxide sequestering media and then a layer of traditional air filter media. The air filter may also be constructed so that the air passes through multiple layers of either traditional air filter media and/or carbon dioxide sequestering media.

For all embodiments of a carbon dioxide sequestering air filter, since there is the possibility of damage to the filter allowing dust to be created from the silicate minerals, it is desirable from a safety point of view for the filter to be constructed so the air flows through a traditional air filter media as a last step before leaving the filter, and for the traditional air filter in this last step to be sized so as to control any escape of silicate mineral dust or particles.

When the carbon dioxide sequestering filtering media is used as part of an air filter (thus creating a carbon dioxide sequestering air filter), it can be used for residential, commercial or industrial installations. The media created here can be used with air filter media or to replace the air filter media currently used.

What is claimed is:

1. An air filter media comprising air filter media containing carbon dioxide sequestering media, wherein the carbon dioxide sequestering media comprises a woven substrate and uncoated fibers of a silicate mineral,
   wherein the uncoated fibers are woven into the substrate;
   wherein the silicate mineral is at least one mineral selected from the group consisting of olivine, fayalite, fosterite, and serpentine; and
   wherein the carbon dioxide sequestering media is air-porous.

2. The air filter media of claim 1, wherein the uncoated fibers of the silicate mineral have varying lengths.

3. The air filter media of claim 2,
   wherein the carbon dioxide sequestering media media comprises a cloth, the cloth comprising a plurality of woven yarns;
   wherein each of the woven yarns comprises a plurality of the uncoated fibers twisted together.

4. The air filter media of claim 1, where the silicate mineral comprises olivine.

5. The air filter media of claim 4, wherein the uncoated fibers of the silicate mineral have varying lengths.

6. An air filter media comprising air filter media containing carbon dioxide sequestering media, wherein the carbon dioxide sequestering media comprises a woven substrate and a plurality of yarns,
   wherein each yarn comprises at least two uncoated fibers of a silicate mineral twisted together;
   wherein the plurality of yarns are woven into the substrate;
   wherein the silicate mineral is at least one mineral selected from the group consisting of olivine, fayalite, fosterite, and serpentine; and
   wherein the carbon dioxide sequestering media is air-porous.

7. An air filter media comprising:
   an air-porous first substrate,
   an air filter media containing carbon dioxide sequestering media,
      wherein the carbon dioxide sequestering media incorporates an uncoated silicate mineral,
      wherein the silicate mineral is at least one mineral selected from the group consisting of olivine, fayalite, fosterite, and serpentine; and
   a bonding agent;
      wherein the bonding agent bonds the uncoated silicate minerals to the air-porous first substrate.

8. The air filter media of claim 7, wherein the uncoated silicate mineral comprises olivine.

9. The air filter media of claim 7, wherein the first substrate comprises a thread.

10. The air filter media of claim 7,
    wherein the first substrate comprises a yarn;
    wherein the yarn comprises at least two threads twisted together.

11. The air filter media of claim 7, wherein the first substrate comprises a cloth, the cloth comprising a plurality of woven yarns.

\* \* \* \* \*